United States Patent
Schweitzer

(10) Patent No.: US 10,193,370 B1
(45) Date of Patent: Jan. 29, 2019

(54) MECHANICALLY CONTROLLED PRE-CHARGE SYSTEM

(71) Applicant: Amazon Technologies, Inc., Seattle, WA (US)

(72) Inventor: Benjamin Martin Schweitzer, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 308 days.

(21) Appl. No.: 15/277,426

(22) Filed: Sep. 27, 2016

(51) Int. Cl.
  *B60L 11/18* (2006.01)
  *H02J 7/00* (2006.01)
  *B64C 39/02* (2006.01)
  *B64D 27/24* (2006.01)

(52) U.S. Cl.
  CPC .......... *H02J 7/0088* (2013.01); *B64C 39/024* (2013.01); *B64D 27/24* (2013.01); *B64C 2201/042* (2013.01)

(58) Field of Classification Search
  CPC . B60L 11/1853; B60L 11/1861; H02J 7/0021; H02J 7/0068; H02J 7/0045
  See application file for complete search history.

(56) References Cited

U.S. PATENT DOCUMENTS

| 5,986,558 A * | 11/1999 | Crawford | H02H 9/004 340/638 |
| 2018/0029490 A1* | 2/2018 | Fritz | B60L 11/1853 |

* cited by examiner

*Primary Examiner* — Rexford Barnie
*Assistant Examiner* — Terrence Willoughby
(74) *Attorney, Agent, or Firm* — Kilpatrick Townsend & Stockton LLP

(57) ABSTRACT

Methods and systems for installing an electrical power source in an electrical device can include positioning the electrical power source in a device-charging position associated with a first charge path that has a nonzero electrical resistivity, maintaining the electrical power source in the device-charging position for a nonzero time with a mechanism, and moving the electrical power source from the device-charging position to an installed position associated with a second charge path that has less resistivity than the first nonzero electrical resistivity. Devices can include a mechanism and the first and second charge paths, the mechanism configured to move a power source from a device-charging position to an installed position over a nonzero time.

20 Claims, 12 Drawing Sheets

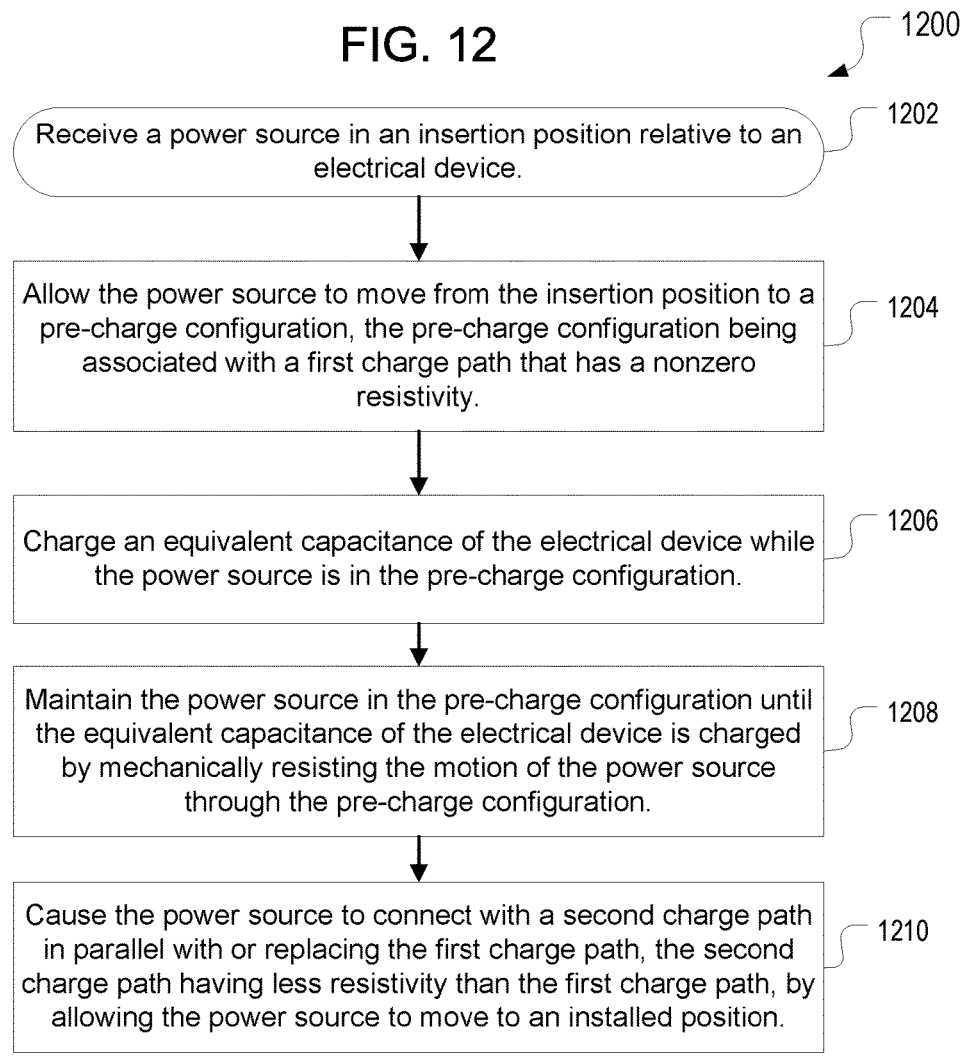

MECHANICALLY CONTROLLED PRE-CHARGE SYSTEM

BACKGROUND

Electric vehicles have been developed for a wide variety of personal and industrial tasks including personal transportation, commercial transportation, entertainment, and industrial applications. One example of an electric vehicle that has become commonplace is the remote-controlled or semi-autonomous unmanned aerial vehicle (UAV). UAVs may have significant applications in personal use (e.g., for entertainment) but may also have significant commercial applications as platforms for videography, for moving inventory in supply chain facilities, or even for carrying parcels in commercial delivery. As operational requirements of UAVs have increased, power requirements have also increased, leading to a need to repeatedly swap out the power source or battery in order to minimize nonoperational time. The internal electronics of a UAV, however, can be sensitive to an initial current spike that may occur when a new power source is substituted for a depleted supply. Conventional techniques for minimizing the detrimental impacts of swapping power supplies include electronic pre-charge circuits that limit the magnitude of the initial current spike. Existing electronic pre-charge circuits can malfunction and add weight and cost.

BRIEF DESCRIPTION OF THE DRAWINGS

Various embodiments in accordance with the present disclosure will be described with reference to the drawings, in which:

FIG. 12 is a third example process for pre-charging an electrical device, in accordance with embodiments.

DETAILED DESCRIPTION

Figure 1:
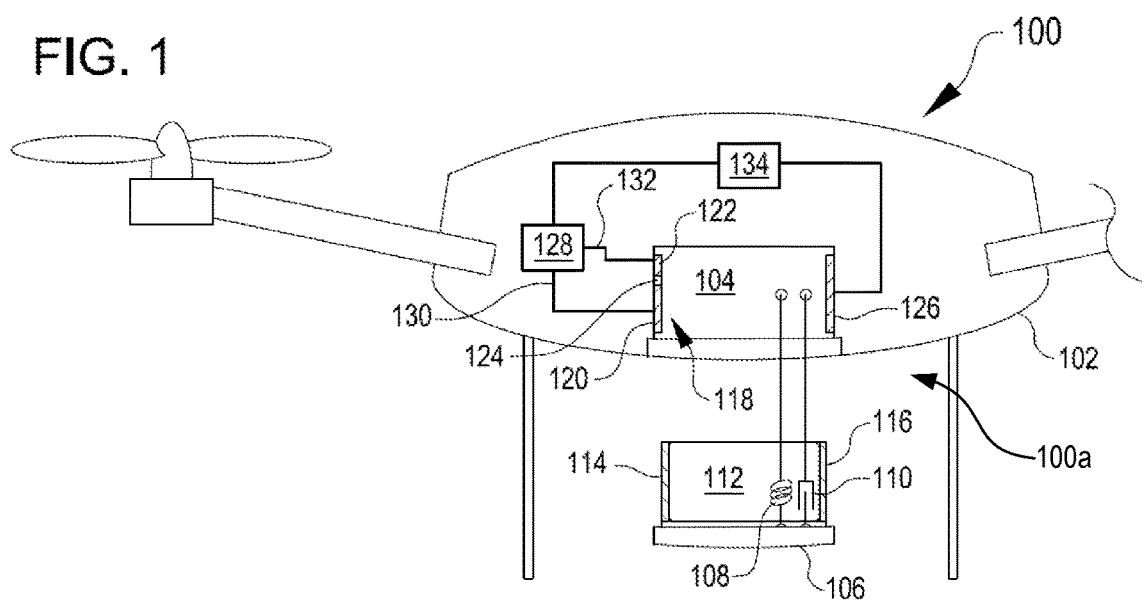
FIG. 1 illustrates an example system for pre-charging an electrical device, in accordance with embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The internal electronics of many electronic devices can be sensitive to abrupt changes in current caused when the electronic devices are connected to power source. The internal electronic devices may also present themselves as capacitive loads, and draw large amount of current for a period of time when connected to an energy source such as a battery. This sensitivity to abrupt changes in current is particularly challenging to accommodate for devices that possess sensitive electrical circuits, or that require large power sources. For example, relatively large power sources are commonly used in electrical vehicles like remotely controllable or autonomous flying UAVs, in automotive applications, in robotic applications, and many other personal, commercial, and industrial applications. Because these power sources are regularly depleted during operation of the vehicles, it has been suggested that consistent operation of electrical vehicles may be achieved by regularly swapping depleted power sources for charged power sources rather than merely recharging the power sources while retained in the vehicle. Conventional techniques for minimizing the detrimental impacts of swapping power supplies include electronic means of gradually switching on the power from a new power source. These techniques may be performed with an electronic timing switch that a user activates after inserting a new power source into the device. Such electronic timing switches require their own, independent power source to activate, and need to be activated after the power source is installed in the device. Thus, conventional techniques for minimizing the impact of repeated power-source swapping can require a multi-step process and can be prone to modes of failure that are invisible to a user, such as failure of the independent power source of the electrical switch.

Embodiments herein are directed to systems and methods for pre-charging an electrical device while mechanically installing a power source. Specifically, features herein are directed to placing a power source in a pre-charging configuration, where the power source connects with an electrical circuit of the electrical device by way of a first charge path that has a nonzero resistivity. The resistivity of the first charge path interacts with an equivalent capacitance of the electrical device to create an RC circuit with a nonzero time constant, reducing the current through the circuitry of the device to safe levels. A mechanism moves the power source through a range of positions defining the pre-charging configuration while keeping the power source electrically interfaced with the first charge path for a nonzero period of time. The nonzero period of time is dependent on attributes of the mechanism, for example: where the mechanism includes a spring with a spring force and a damper with a damping force, the nonzero period of time depends on the spring and damping forces applied to the power source by the mechanism. The mechanism can act against outside forces, e.g., as a spring/damper mechanism pulling a power source up into a compartment of a device against gravity, or slowing the motion of a power source inserted into a device from above under the power of gravity, or slowing the motion of a power source inserted using any other suitable external force. The mechanism moves the power source to an installed position after the nonzero period of time, where the installed position includes electrically connecting the power source to the electrical device by way of a second charge path that has less resistivity than the first charge path. In general, the second charge path may have significantly less resistivity than the first charge path (e.g., the second charge path and first charge path may be circuits that connect to a common node, where the first charge path includes a resistor and the second charge path does not).

In some embodiments, connecting the power source to the second charge path can include interfacing a first lead (i.e., battery terminal or power source terminal) of the power source with a third terminal that connects the power source with the second charge path by moving the power source into the installed position. In such cases, the pre-charging configuration can include a range of positions where the first lead of the power source connects with a first terminal that connects with the first charge path, while the second lead of the power source connects with the electrical device. The terminals that connect to each of the first and second charge paths can be proximate to one another but separated by an insulating region so that the first lead of the power source can move from contacting one charge path to contacting the other charge path, or can move from contacting one charge path to contacting both charge paths.

In some embodiments, connecting the power source to the second charge path can include triggering a switch by way of a mechanical linkage when the power source is moved into the installed position. For example, while the power source is in the pre-charging configuration, the power source can be electrically connected with the first charge path, but disconnected from the second charge path by the open switch. The mechanical linkage can interfere with a compartment for containing the power source, so that when the power source is moved from the pre-charging configuration (i.e., a range of pre-charging positions) to the installed position, the mechanical linkage closes the switch, electrically connecting the power source with the second charge path. The range of pre-charging positions may include any position in which the power source is connected with the electrical device by way of the first charge path that has higher resistivity than the second charge path.

Embodiments herein are also directed to devices that include an electrical circuit having an equivalent capacitance, and a compartment configured to receive a battery or other suitable power source. In general, power source and battery may be used interchangeably herein, although it will be understood that non-battery power sources may also be connected with an electrical device by the methods described herein. The compartment can have a first terminal and a second terminal for electrically connecting the battery with the circuit, and a mechanism for moving the battery into the compartment. When the battery is in a pre-charging configuration, the battery is electrically connected with the circuit by a first charge path having a nonzero resistance. When the battery is in an installed position, the battery is electrically connected with the circuit by a second charge path having a second, lower resistance. The mechanism is operable to move the battery from the pre-charging configuration to the installed position, and to retain the battery in the pre-charging configuration for a predetermined period of time before moving the battery to the installed position.

FIG. 1 illustrates an example system 100 for pre-charging an electrical device, in accordance with embodiments. In the example system 100, an electric device 102 is configured to receive a power source 112 in an insertion configuration 100a where the power source is not yet inserted. In general, suitable power sources may be batteries or other modular storage devices for electrical energy, and terms such as 'battery' and 'power source' may be used interchangeably herein where referring to modular power sources such as batteries. However, the principles described herein may apply to other power sources, such as tethered connections, capacitors, generators, or other sources of electrical power. The device 102 may be an electric vehicle, such as a UAV (as shown), any other suitable robotic or radio-controlled device of various sizes, including but not limited to RC cars, electric vehicles, robotic inventory handlers, or other electric devices. The device 102 may be a non-vehicle electric device, particularly a device with high power requirements, such as audio equipment, a computer, or similar device.

In accordance with embodiments, the device 102 has a compartment 104 for receiving the power source, and has internal circuitry 134, which may include a wide variety of computer components (e.g. processors, memory, sensors, and the like) and electromechanical components (e.g. actuators or motors). The circuitry 134 has an equivalent capacitance, which may include capacitance of the various electrical and electromechanical components in addition to any suitable number of capacitors designed to regulate current in the device. The device 102 has a first terminal assembly 118 and a second terminal 126 for electrically interfacing with the power source 112. The first terminal assembly 118 and second terminal 126 are arranged to receive the opposing leads of a battery, although it will be understood that the positive and negative polarities of the leads will depend on the arrangement of the circuitry 134. The first terminal assembly 118 includes a first terminal 120, a third terminal 122, and an insulating region 124 that electrically separates the first and third terminals.

The first terminal 120 is electrically connected with a first charge path 130, and the third terminal 122 is electrically connected with a second charge path 132. The first and second charge paths 130, 132 can have different resistivity. For example, the first and second charge paths 130, 132 can merge at a resistor circuit 128 that merges the charge paths while imparting a different resistivity to one or the other charge path. In embodiments, the first charge path 130 has a first, nonzero, resistivity; and the second charge path 132 has a resistivity that is lower than the first resistivity. In some cases, the resistivity of the second charge path 132 can be approximately zero, i.e., a circuit with no added resistance.

The resistivity of the first charge path 130 is sufficient to reduce the current through the internal circuitry 134 while any capacitors or capacitive circuits charge to a steady state. By way of example, for some applications like electric vehicles or UAVs, the equivalent capacitance of the internal circuitry 134 is on the order of approximately 1000-1500 μF. To adequately protect the internal circuitry 134 of some electronic devices, an RC time constant (the time required to charge a capacitor to approximately 63.2% of its steady state charge) of approximately 3-5 seconds is advantageous. Thus, for electrical devices having equivalent capacitances in the 1000-1500 μF range, a desired resistivity of the first charge path 130 may be on the order of from 300-500Ω, from 300-750Ω, or more. For electrical vehicles like electric cars and trucks, the equivalent capacitance of the internal circuitry may be on the order of 1500-10,000 μF, in which case desired resistivity of the first charge path 130 may vary from about 450-3000Ω, from 450-5000Ω, or more. By contrast, some electrical devices with lower capacitances may also employ methods described herein. By way of example, electric devices like an electric bike may have an equivalent capacitance of approximately 100 μF, in which case a time constant of 3-5 seconds may be achieved with a resistivity in the first charge path of approximately 30-50Ω. It will be understood that the specific resistivity of the first charge path 130 may be varied according to the desired time constant, and according to the equivalent capacitance of the internal circuitry 134 of the electric device 102.

The power source 112 can be drawn into the compartment 104 to interact with the terminals 120, 122, 126 by way of a mechanism 106. The mechanism 106 can include any suitable actuator for moving the power source 112, but particularly an include at least one spring 108 and at least one damper 110, forming a spring/damper system with a spring force and a damping force. In operation, the mechanism 106 can be withdrawn from the device 102, e.g. by hand or by an external force, and the power source 112 can be placed in the mechanism oriented so that a first lead 114 of the power source aligns with the first terminal 120, and a second lead 116 of the power source aligns with the second terminal 126. When released, the mechanism 106 can pull the power source 112 toward the compartment 104. The mechanism 106 can, in some cases, include an external hatch or cover for protecting the power source 112 in the electrical device 102.

Figure 2:
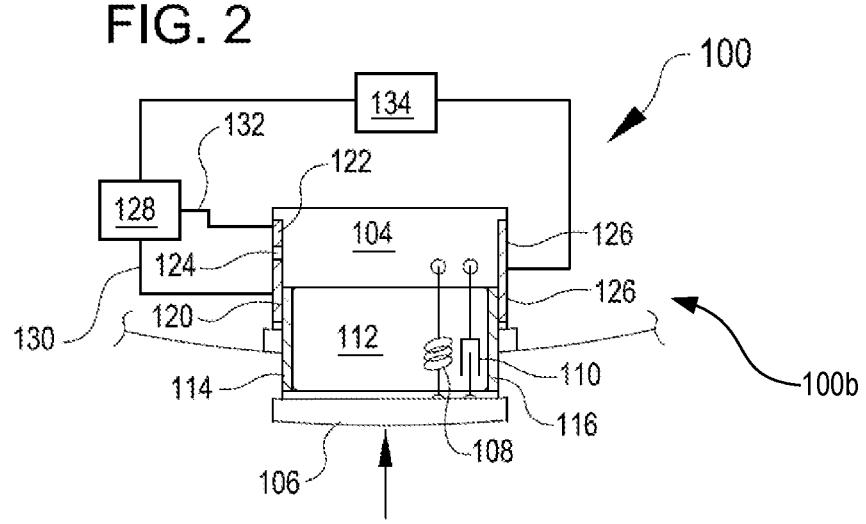
FIG. 2 illustrates the system of FIG. 1 showing a pre-charging configuration.

FIG. 2 illustrates the system 100 of FIG. 1 showing a pre-charging configuration 100b, where the mechanism 106 has pulled the power source 112 partially into the compartment 104. In the pre-charging configuration, the first lead 114 of the power source 112 is in contact with the first terminal 120. Thus, the first lead 114 is electrically connected with the first charge path 130. The second lead 116 of the power source 112 is in contact with the second terminal 126, completing a circuit through the circuitry 134 and allowing any capacitors in the circuitry to charge while electricity flows through the first charge path 130. The second charge path 132 is not connected with the power source 112. The mechanism 106 is shown pulling the power source 112 into the compartment 104 by way of the spring force of the spring 108, while the damper 110 resists the spring force and restrains the speed of movement of the power source into the compartment. The spring force also counteracts the weight of the power source 112. The spring force and damping force are adjusted in line with the expected weight of the power source 112 as well as any other forces, such as friction at the terminals 120, 126, to provide for a smooth capture of the power source 112 over a predetermined, nonzero period of time. In general, the spring force and damping force are tuned to provide a transit time of the power source 112 through the pre-charging configuration on the order of one or more time constants of the RC circuit formed by the power source 112, first charge path 130, and circuitry 134. For example, where the time constant is on the order of 0.5-5 seconds, a suitable transit time for the power source 112 in the pre-charge configuration may be on the order of 0.5-5 seconds as well. However, in some cases, it may be desirable to pre-charge the circuitry 135 beyond 63.2% before transitioning to the second charge path 132. Therefore, the desired transit time across the pre-charge configuration may be as long as several time constants, e.g. 1-10 seconds, 1.5-15 seconds, or longer. In some cases, the capacitors or capacitive circuits in the circuitry 134 may be charged instead to a predetermined percentage of the steady-state value, e.g. to about 85% or more, to about 90% or more, to about 95% or more, or to about 99%. The predetermined percentage of the steady-state value may be selected to conform to a safe pre-charge level for a specific circuit or specific application, e.g. to prevent damage to a control board for an electronic device such as a UAV.

If the values of the battery mass, spring constant and damping constant are known, the system's mechanical behavior can be described with the following Equation 1:

$$m\ddot{x}+c\dot{x}+kx=0 \quad \text{Equation 1}$$

In Equation 1, m is the battery mass, x is the position of the battery relative to a fixed reference frame, c is the damping constant, and k is the spring constant. To ensure the mechanical motion of the battery in the pre-charge configuration lasts as long as necessary to achieve the target pre-charge voltage values defined above, the system must be critically damped, or preferably overdamped. Overdamping occurs when the value of $$c^2-4mk$$

is significantly greater than zero. When the system is overdamped, the position of the battery will follow an exponential decay curve, the duration of which can be tuned to match the intended pre-charge time. Any combination of the constants (c, m, and k) may be altered to achieve this behavior.

Figure 3:
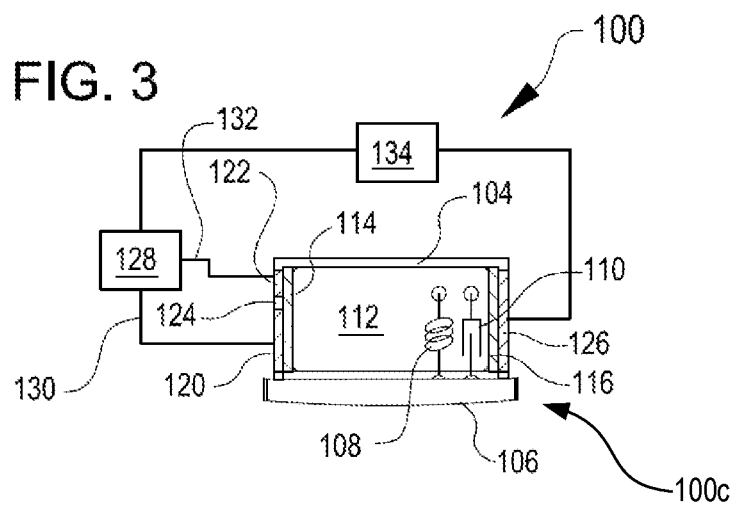
FIG. 3 illustrates the system of FIG. 1 showing an installed position.

FIG. 3 illustrates the system 100 of FIG. 1 showing an installed position 100c, where the mechanism 106 has fully inserted the power source 112 into the compartment 104 and the power source is electrically connected with the second charge path 132. When the power source 112 transitions from the pre-charge configuration (see FIG. 2) to the installed position, the first lead 114 crosses the insulating region 124 to come into contact with the third terminal 122. In the installed position, the power source 112 can power the circuitry 134 without passing charge through the first charge path 130.

Figure 4:
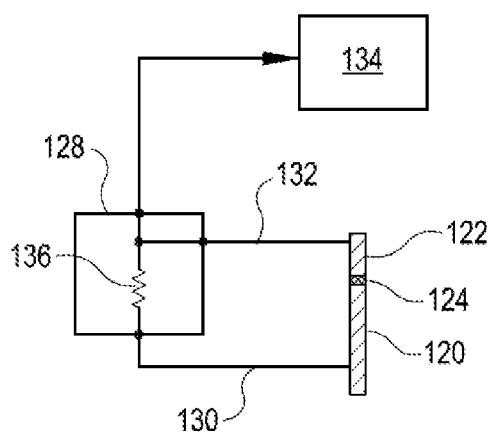
FIG. 4 illustrates aspects of the system of FIG. 1 in greater detail according to some embodiments.

FIG. 4 illustrates aspects of the system 100 of FIG. 1 in greater detail according to some embodiments. Specifically, one embodiment of the resistor circuit 128 is shown in detail, where the resistor circuit joins the first charge path 130 and the second charge path 132. The first charge path 130 has a resistor 136 that imparts resistivity to the first charge path that is greater than the resistivity of the second charge path 132. It will be understood that equivalent circuits may provide similar functionality to the resistor circuit 128.

Figure 5:
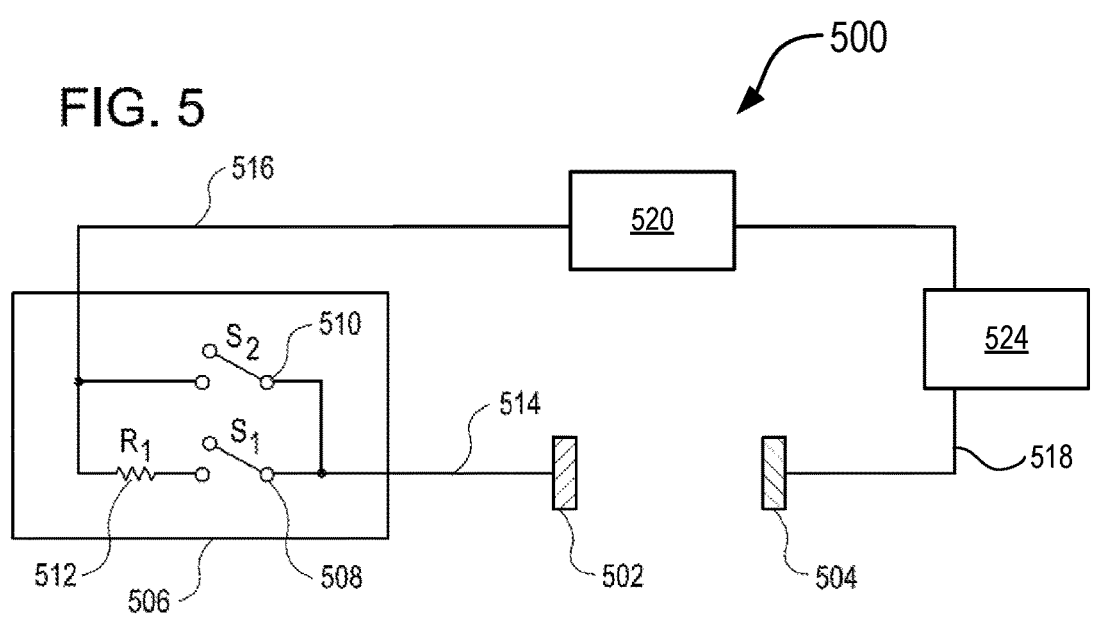
FIG. 5 illustrates an example of a conventional system for pre-charging an electrical device for comparison with the system of FIGS. 1-4.

FIG. 5 illustrates an example of a conventional system 500 for pre-charging an electrical device, for comparison with the system of FIGS. 1-4. The conventional system 500 is generally more electrically complex than the system 100 of FIGS. 1-4. For example, in the conventional system 500, a first terminal 502 and a second terminal 504 are arranged to electrically connect with a power source. The conventional system may include a capacitive element 520 including any suitable number of capacitors and/or capacitive components therein for regulating current in the device, and may include other circuitry 524. The capacitive element and/or circuitry 520, 524 may connect with the second terminal 504 by way of one or more direct electrical connections 518. In contrast, the first terminal 502 may connect 514 with a switching circuit 506. The switching circuit 506 passes power via one or more electrical connections 516 to the rest of the system 500. In the switching circuit 506, a first switch 508 is in line with a resistor 512, and a second switch 510 bypasses the resistor. In typical operation, a power source would be electrically connected with the terminals 502, 504 before the first switch 508 is closed. After a predetermined period of time, the second switch 510 is closed, and the first switch 508 may be opened. The order and timing of activating the first and second switches 508, 510 may be determined and performed electronically by the switching circuit 506. In contrast, the system 100 shown in FIGS. 1-4 can adapt a power source to an electrical device without a timing circuit, and by mechanical means, as follows.

Figure 6:
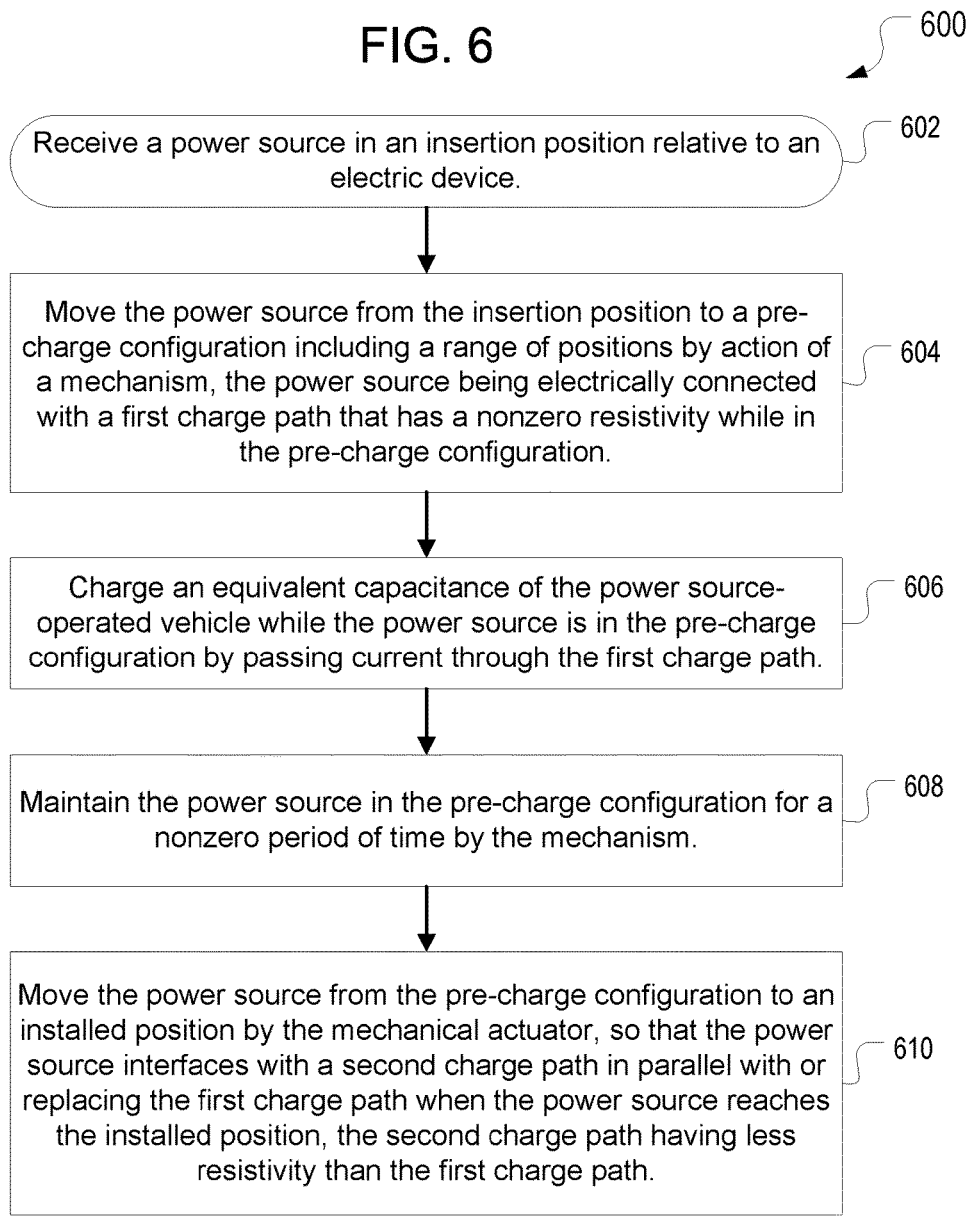
FIG. 6 is an example process for pre-charging an electrical device, in accordance with embodiments.

FIG. 6 is an example process 600 for pre-charging an electrical device, in accordance with embodiments. Aspects of the process 600 may be performed, in embodiments, by a system similar to the system 100 shown in FIGS. 1-4. The system may be implemented in an electric vehicle, such as an unmanned electric vehicle (UAV), or any other suitable electric vehicle or electric device in which a power source is periodically replaced.

In an embodiment, the process 600 includes receiving a power source in an insertion position relative to an electric device or vehicle (act 602). The insertion position may include aligning leads of the power source with terminals of the device, or aligning the power source with a power source compartment or power source receptacle of the device. Inserting the power source in the insertion position may in some cases require first extending a mechanism from the device to retain the power source. For example, the mechanism can be power source compartment hatch that is connected with the power source compartment by a spring and damper system. Next, the power source is moved from the insertion position into a pre-charge configuration by action of the mechanism (act 604). In operation, moving the power source into the pre-charge configuration can include the mechanism pulling the power source partially into the power source compartment, and causing the leads of the power source to come into contact with terminals in the power source compartment (e.g., first and second terminals) that connect the power source with a first charge path, e.g., first charge path 130 as shown in FIGS. 1-4.

The pre-charge configuration can include a range of positions between the insertion position and the installed position, and is defined by the interface between the power source and the first charge path without interfacing with the second charge path. As the power source is moved through the pre-charge configuration, it is retained in contact with the first charge path for a nonzero period of time by the mechanism (act 608). The nonzero period of time can correspond to any suitable, predetermined period of time suitable for charging an equivalent capacitance of the power source operated device or device, as discussed above with reference to FIG. 1. After the non-zero period of time, the mechanism moves the power source from the pre-charge configuration to the installed configuration by moving the power source into electrical contact with the second charge path (act 610). In some cases, moving the power source into electrical contact with the second charge path includes causing a lead of the power source to contact a third terminal in the power source compartment (e.g. terminal 122 shown in FIG. 1). The transition from the pre-charge configuration to the installed position can be achieved based on the mechanical actuation of the mechanism rather than by an electrical switch.

Figure 7:
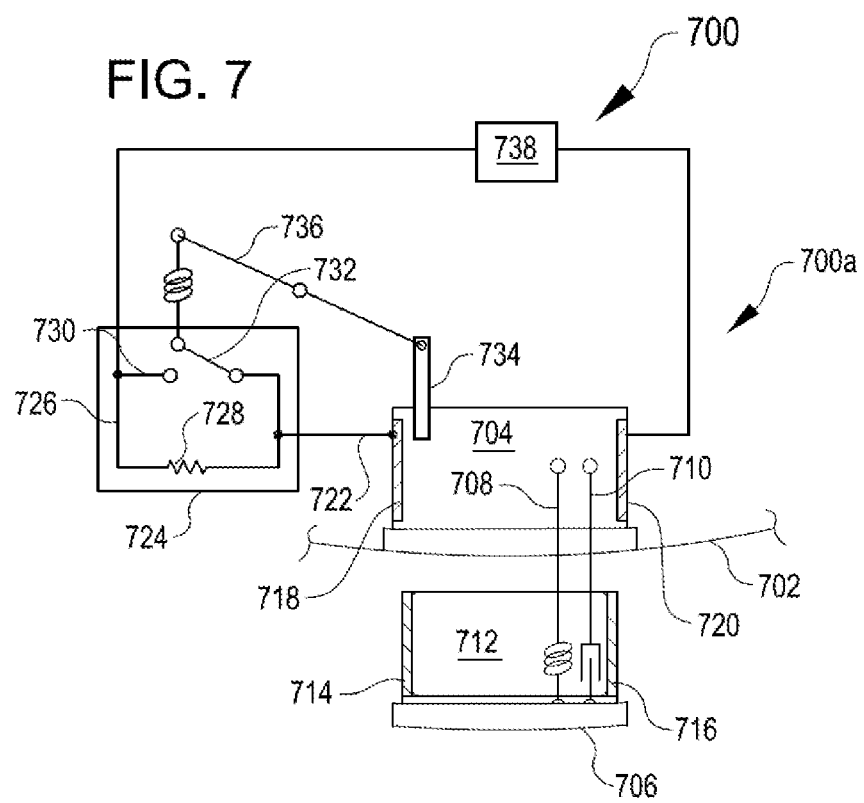
FIG. 7 illustrates a second example system for pre-charging an electrical device, showing a pre-charging configuration, in accordance with embodiments.

FIG. 7 illustrates a second example system 700 for pre-charging an electrical device 702, showing an insertion configuration 700a, in accordance with embodiments. In the example system 700, an electrical device 702 is configured to receive a power source 712 in an insertion configuration where the power source is not yet inserted. The electrical device may be any suitable device that can periodically receive a replacement battery or other power source as described above with respect to FIG. 1.

In accordance with embodiments, the device 702 has a compartment 704 for receiving the power source 712, and a mechanism 706 is configured to receive the power source and move the power source into the compartment 704 by way of a spring/damper assembly including a spring 708 having a spring force that pulls the mechanism toward the compartment and a damper 710 having a damping force that resist motion of the mechanism 706. The spring and damper 708, 710 are arranged to cause the mechanism 706 to pull the power source 712 into the compartment 704 at a predictable or predetermined rate.

The device 702 includes circuitry 738 that has an equivalent capacitance, as described above with reference to circuitry 134 (FIG. 1). The circuitry 738 may be electrically connected with a power source 712 when the power source is in the compartment 704 by way of a first terminal 718 and a second terminal 720 that are arranged to interface with the first and second leads 714, 716 of the power source 712. The first terminal 718 can connected with a switching device 724 that connects a first circuit 722 to a first charge path 726 which has a resistor 728, and to a second charge path 730 that has a switch 732.

In operation, while the power source is not fully inserted in the compartment 704, the switch 732 is open and the first terminal 722 is electrically connected only with the first charge path 726 that includes the resistor. As the power source 712 is drawn into the compartment 704 by the mechanism 706, the first and second leads 714, 716 of the power source 712 begin to contact the first and second terminals 718, 720, respectively, and supply power to the circuitry 738 by way of the first charge path 726. While the power source 112 is causing current to flow through the first charge path 726, the system 700 is in the pre-charge configuration. The resistivity of the first charge path 726 provides for an RC circuit with a suitable time constant for safely charging any capacitors or capacitive components in the circuitry 738. The motion of the power source 112 into the compartment 704 is predictable based on the spring and damping forces provided by the spring and damper 708, 710, such that the amount of time needed for the power source 112 to traverse the pre-charge configuration can be predetermined, and adjusted to match a desired time to adequately charge the equivalent capacitance of the circuitry 738.

Figure 8:
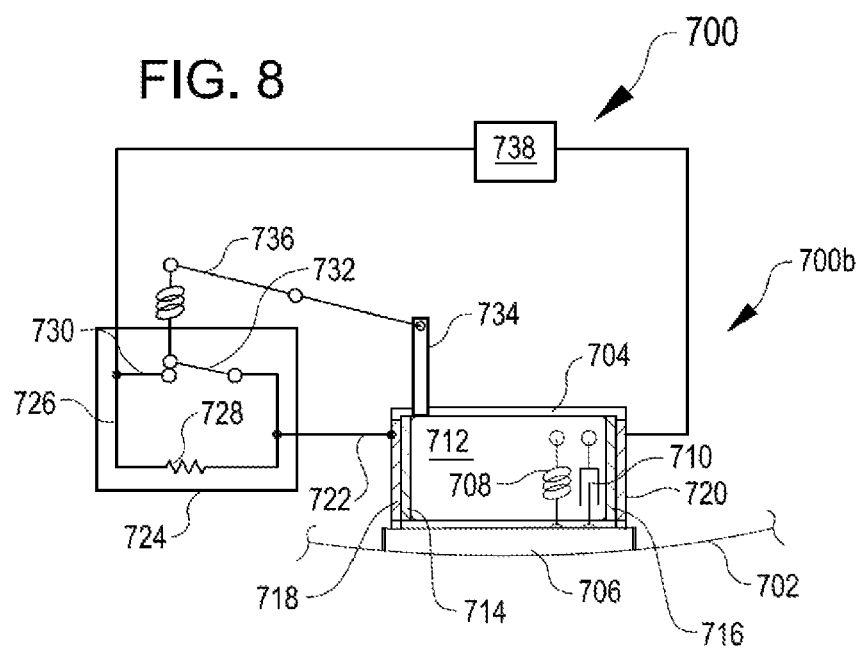
FIG. 8 illustrates the system of FIG. 7 in an installed position.

The switch 732 is connected with an actuator 734 in the compartment 704 by way of a mechanical linkage 736, and positioned to interfere with the power source 712 and/or with the mechanism 706 when the power source 712 moves into a fully installed position, as shown by FIG. 8.

FIG. 8 illustrates the system 700 of FIG. 7 in an installed position. In the installed position 700b, the power source 712 and/or the mechanism 706 has fully installed the power source 712, which interferes with the actuator 734, causing the switch 732 to close. When the switch 732 is closed, the first terminal 718 is electrically connected to the second charge path 730, which has less resistivity than the first charge path 726. As described above with respect to the second charge path 132 (FIGS. 1-4), the second charge path may have negligible resistivity by comparison to the first charge path 726.

Figure 9:
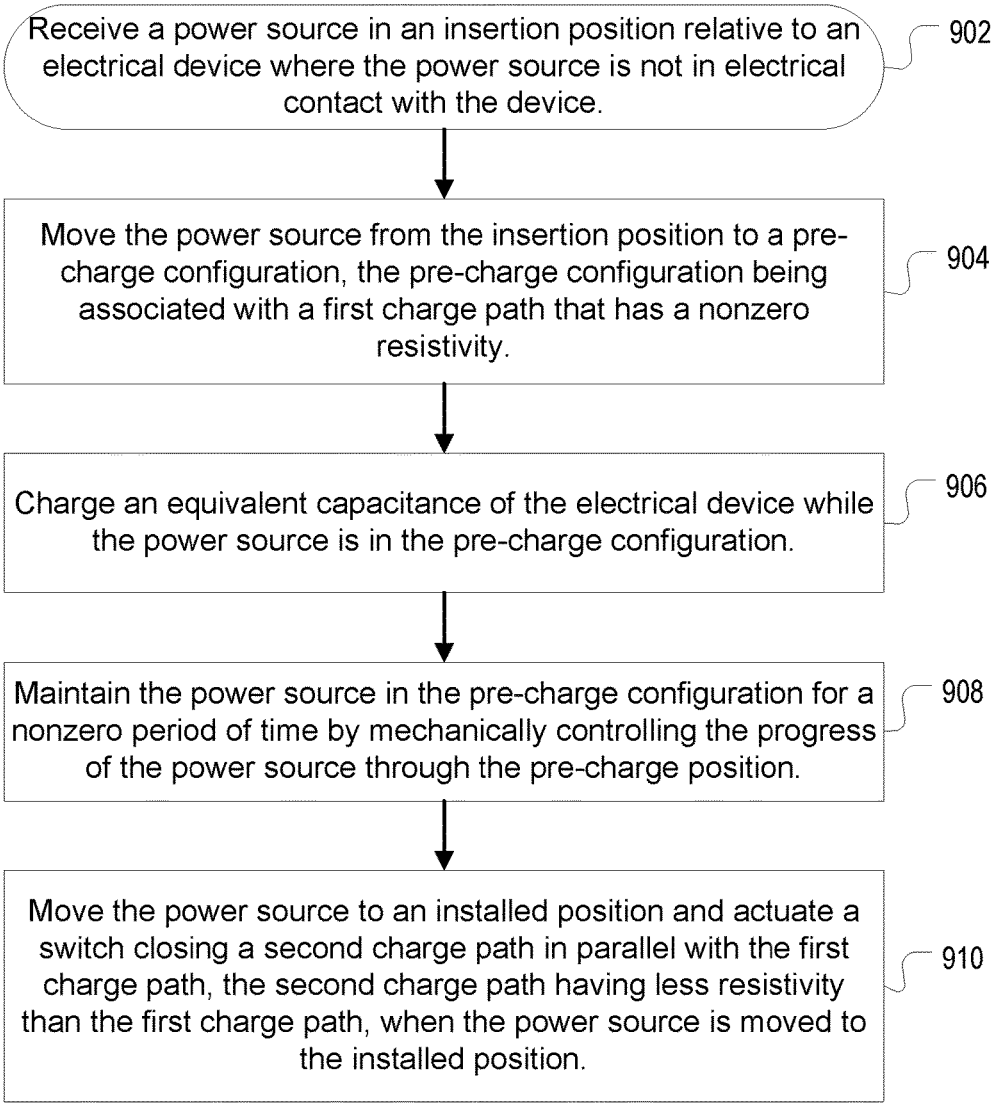
FIG. 9 is a second example process for pre-charging an electrical device, in accordance with embodiments.

FIG. 9 shows a second example process 900 for pre-charging an electrical device, in accordance with embodiments. Aspects of the process 900 may be performed, in embodiments, by a system similar to the system 700 shown in FIGS. 7-8. The system may be implemented in an electric vehicle, such as an unmanned electric vehicle (UAV), or any other suitable electric vehicle or electric device in which a power source is periodically replaced.

In an embodiment, the process 900 includes receiving a power source in an insertion position relative to an electric device or vehicle (act 902). The insertion position may include aligning leads of the power source with terminals of the electric device, or aligning the power source with a power source compartment or power source receptacle of the electric device. Generally, leads of the power source are not in contact with the terminals of the electric device in the insertion position. Inserting the power source in the insertion position may in some cases require first extending a mechanism from the device to retain the power source. For example, the mechanism can be power source compartment hatch that is connected with the power source compartment by a spring and damper system.

Next, the power source is moved from the insertion position into a pre-charge configuration by action of the mechanism (act 904). In operation, moving the power source into the pre-charge configuration can include the mechanism pulling the power source partially into the power source compartment, and causing the leads of the power source to come into contact with terminals in the power source compartment (e.g., first and second terminals 718, 720 shown in FIGS. 7-8).

The pre-charge configuration can include a range of positions between the insertion position and the installed position, and may be defined by the interface between the power source and the first charge path without interfacing with the second charge path. While the power source is in the pre-charge configuration, the power source charges an equivalent capacitance of the electrical device by passing current through the first charge path (e.g. first charge path 726, FIG. 7) until the electrical device is charged to a steady-state or to a predetermined percentage of steady-state. As the power source is moved through the pre-charge configuration, it is retained in contact with the first charge path for a nonzero period of time by the mechanism (act 908). The nonzero period of time can correspond to any suitable, predetermined period of time suitable for charging an equivalent capacitance of the power source operated device or device, as discussed above with reference to FIG. 2.

After the non-zero period of time, the mechanism moves the power source from the pre-charge configuration to the installed configuration by moving the power source and/or mechanism (e.g. power source 712 or mechanism 706, FIGS. 7-8) into contact with the actuator 734 (FIGS. 7-8), in order to close the second charge path (act 910). The transition from the pre-charge configuration to the installed position can be achieved based on the mechanical actuation of the switch 734 rather than by an electrically controlled switch.

Figure 10:
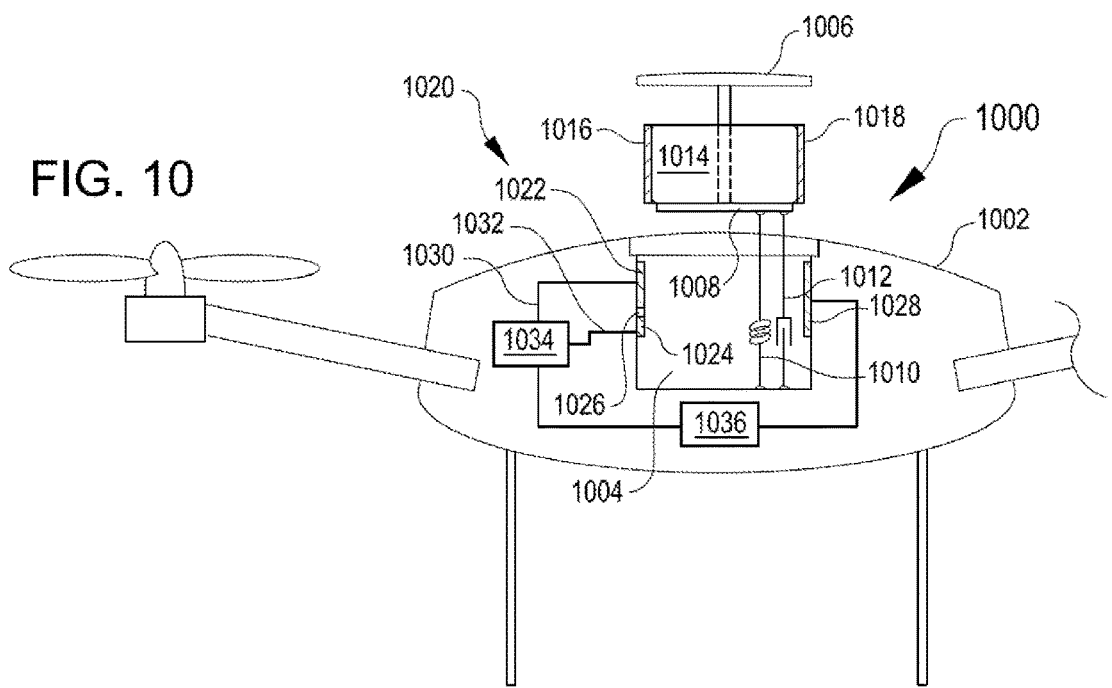
FIG. 10 illustrates a third example system for pre-charging an electrical device, in accordance with embodiments.

FIG. 10 illustrates a third example system 1000 for pre-charging an electrical device 1002, showing an insertion configuration 1000*a*, in accordance with embodiments. In the example system 1000, the electrical device 1002 is configured to receive a power source 1014 into a compartment 1004. The power source 1014 is held by a mechanism 1006 that includes a supportive platform 1008, a spring 1010 that provides a spring force and a damper 1012 that provides a damping force. The spring force and damping force are tuned to cause the mechanism 1006 to draw the power source 1014 into the compartment 1004 in a controlled manner and at a predetermined rate when the power source 1014 is placed in the mechanism. In some cases, the spring force and damping force may be tuned to resist the force of gravity acting on the power source 1014.

The electrical device 1002, which may be any suitable electric device as discussed with respect to systems 100 (FIGS. 1-4) and 700 (FIGS. 7-8), including electric vehicles such as UAVs and other devices. The electrical device 1002 can be represented by internal circuitry 1036, which can have an equivalent capacitance as a result of a combination of capacitive components (e.g. motors, processors, memory, etc.) and capacitors designed to regulate current in the device. The electrical device 1002 is arranged to draw power from the power source 114 when the power source in installed in the compartment 1004, and is connected with a second terminal 1028 and a resistor circuit 1034. The resistor circuit 1034 is connected with first and third terminals 1022, 1024 and can pass power from the first and/or third terminals to the circuitry 1036.

In operation, the mechanism 1006 draws the power source 1014 into the compartment 1004, where the first and second leads 1016, 1018 of the power source contact the first and second terminals 1022, 1028. The set of positions through which the power source 1014 is electrically connected with the first and second terminals 1022, 1028, but not with the third terminal 1024, may be referred to as a pre-charge configuration. While in the pre-charge configuration, the power source 1014 passes current through the first charge path 1030 into the resistor circuit 1034. The first charge path 1030 has a nonzero resistivity which, in combination with the equivalent capacitance of the internal circuitry 1036, creates an RC circuit with a predetermined time constant. The resistivity of the first charge path 1030, which may be set by a resistor in the resistor circuit, may be tuned to set the time constant in order to provide a safe rate of charging for the equivalent capacitance that is not damaging to components in the internal circuitry 1036.

The rate of travel of the mechanism 1006 into the compartment 1004 can also be turned by setting the spring force and damping force of the spring 1010 and damper 1012. This rate of travel is tuned to cause the mechanism 1006 to retain the power source 1014 in the pre-charge configuration for a predetermined period of time. In concert with the known time constant of the system 1000, the rate of travel is set to ensure that the internal circuitry 1036 charges to at least a safe, predetermined percentage of its steady-state capacitance while current is still being passed through the first charge path 1030.

Figure 11:
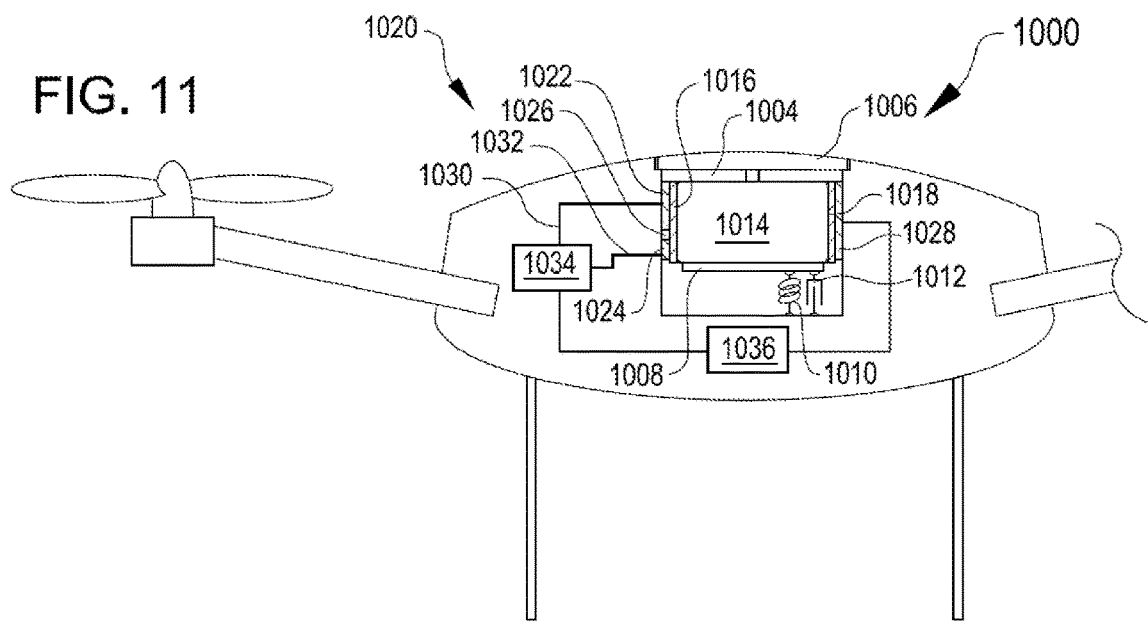
FIG. 11 illustrates the system of FIG. 10 showing an installed position.

FIG. 11 illustrates the system 1000 of FIG. 10 showing an installed position 1000*b*, where the first lead 1016 interfaces with the third terminal 1024. The third terminal 1024 puts the power source 1014 in electrical contact with the second charge path 1032, which has less electrical resistivity than the first charge path 1030. In some cases, the second charge path 1032 has negligible resistivity compared to the first charge path 1030. In some cases, the first and third terminals 1022, 1024 are both in contact with the first lead 1016 when the power source 114 is in the installed position 1000*b*; however, in some cases, the first lead 1016 may be disconnected from the first terminal once the power source is fully installed. As the power source 114 is transitioned from a pre-charge configuration to the installed position 1000*b*, the first lead 1016 may pass over an electrically insulated region 1026 that electrically separates the first and third terminals 1022, 1024.

FIG. 12 is a third example process 1200 for pre-charging an electrical device, in accordance with embodiments. Aspects of the process 1200 may be performed in embodiments, by a system similar to the system 1000 shown in FIGS. 10-11. The system may be implemented in an electric vehicle, such as an unmanned electric vehicle (UAV), or any other suitable electric vehicle or electric device in which a power source is periodically replaced.

In an embodiment, the process 1200 includes receiving a power source in an insertion position relative to an electric device or vehicle (act 1202). The insertion position may include aligning leads of the power source with terminals of the electric device, or aligning the power source with a power source compartment or power source receptacle of the electric device. Generally, leads of the power source are not in contact with the terminals of the electric device in the insertion position. Inserting the power source in the insertion position may in some cases require first extending a mechanism (e.g., mechanism 1006 of FIG. 10) from the device to retain the power source. For example, the mechanism can be power source compartment hatch that is connected with the power source compartment by a spring and damper system. The insertion position may be above the device, such that placing the power source in the insertion position will subject the mechanism to the weight of the power source.

Next, the power source is moved from the insertion position into a pre-charge configuration by action of the mechanism (act 1204). In operation, moving the power source into the pre-charge configuration can include allowing the weight of the power source to push the mechanism and power source partially into the power source compartment, and causing the leads of the power source to come into contact with terminals in the power source compartment (e.g., first and second terminals 1016, 1018 shown in FIGS. 10-11).

The pre-charge configuration can include a range of positions between the insertion position and the installed position, and may be defined by the interface between the power source and the first charge path without interfacing with the second charge path. While the power source is in the pre-charge configuration, the power source charges an equivalent capacitance of the electrical device by passing current through the first charge path (e.g. first charge path 1030, FIG. 10) until the electrical device is charged to a steady-state or to a predetermined percentage of steady-state (act 1206). As the power source is moved through the pre-charge configuration, it is retained in contact with the first charge path for a nonzero period of time by the mechanism (act 1208). The nonzero period of time can correspond to any suitable, predetermined period of time suitable for charging an equivalent capacitance of the power source operated device or device, as discussed above with reference to FIG. 2.

After the non-zero period of time, the mechanism moves, or allows the power source to move, from the pre-charge configuration to the installed configuration (e.g. installed configuration 1000*b*, FIG. 11) in order to interface the first lead of the power source with a third terminal of the electrical device that connects the power source to a second charge path (act 1210). The second charge path has less resistivity than the first charge path, and in some cases, may have negligible resistivity compared to the first charge path.

In some cases, the mechanisms 106, 706, 1006 described above with reference to systems 100, 700, and 1000 (FIGS. 1-4, 7-8, 10-11) may be replaced by, e.g., an electro-mechanism configured to move the battery or power source at a predetermined rate. Thus, in some cases, some or all of the processes 600, 900, 1200 (or any other processes described herein, or variations, and/or combinations thereof) may also be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system to pre-charge an electrical device having a capacitance, the system comprising:
   first, second, and third terminals mounted in a battery compartment of the electrical device; and
   a mechanism configured to receive a battery and move the battery from an insertion position outside the battery compartment, through a range of pre-charging positions where the battery is partially inserted into the battery compartment, to an installed position where the battery is fully inserted into the battery compartment, wherein:
      at the insertion position, the battery is not electrically connected to the first and second terminals;
      within the range of pre-charging positions, a first battery terminal of the battery is electrically connected with the first terminal and a second battery terminal of the battery is electrically connected with the second terminal, the first terminal being electrically connected with a first charge path having a first nonzero resistivity; and
      at the installed position, the first battery terminal is electrically connected with the third terminal and the second battery terminal is electrically connected with the second terminal, the third terminal being electrically connected with a second charge path having a second resistivity that is lower that the first resistivity.

2. The system of claim 1, wherein:
   the electrical device has a charging period based on the capacitance and the first resistivity; and
   the mechanism moves the battery through the range of pre-charging positions for a period of time greater than the charging period.

3. The system of claim 1, wherein the electrical device comprises a battery powered unmanned aerial vehicle (UAV).

4. The system of claim 1, wherein the mechanism comprises a spring and a damper, the spring being configured to exert a force to move the battery from the insertion position, through the range of pre-charging positions, and into the installed position, the damper being configured to resist motion of the battery through the range of pre-charging positions, wherein a spring force of the spring and a damping force of the damper are adapted to cause the mechanism to move the battery through the range of pre-charging positions for at least a predetermined period of time.

5. The system of claim 1, wherein:
   the mechanism comprises a damper configured to resist motion of the battery through the range of pre-charging positions in response to the application of an external force applied to the battery that urges the battery toward the installed position from the insertion position; and
   the damper is adapted to resist movement of the battery through the range of pre-charging positions so that the battery moves through the range of pre-charging positions for at least a desired period of time when the battery is subject to the external force.

6. The system of claim 1, further comprising:
   an electrical switch associated with the second charge path, the electrical switch being open when the battery is in the insertion position and within the range of pre-charging positions; and
   a mechanical linkage between the electrical switch and the battery compartment, the mechanical linkage configured to close the switch when the battery is fully inserted in the battery compartment to electrically connect the second charge path with the first lead of the battery.

7. A method to install an electrical power source in an electrical device, the method comprising:
   moving the electrical power source through a range of pre-charging positions wherein a first power source terminal of the electrical power source interfaces with a first device terminal of the electrical device and a second power source terminal of the electrical power source interfaces with a second device terminal of the electrical device, the first and second power source terminals having a nonzero voltage, and the first power source terminal being electrically connected with a first charge path that has a first nonzero electrical resistivity;
   maintaining the electrical power source within the range of pre-charging positions for a nonzero time; and
   moving the electrical power source from the range of pre-charging positions to an installed position wherein the second power source terminal remains interfaced with the second device terminal and the first power source terminal of the electrical power source is electrically connected with a second charge path that has a second electrical resistivity that is less than the first nonzero electrical resistivity.

8. The method of claim 7, wherein the first lead of the electrical power source interfaces with a third device terminal of the electrical device when the electrical power source is in the installed position, the third device terminal being electrically connected with the second charge path.

9. The method of claim 8, wherein:
   the first device terminal and the third device terminal of the electrical device are proximate to each other and electrically separated; and
   moving the electrical power source from the range of pre-charging positions to the installed position comprises interfacing the first power source terminal of the electrical power source with the third device terminal of the electrical device.

10. The method of claim 7, wherein maintaining the electrical power source within the range of pre-charging positions comprises moving the electrical power source by a mechanism comprising a spring and a damper across a predetermined distance defining the range of pre-charging positions while the first and second power source terminals of the electrical power source interface with the first and second device terminals.

11. The method of claim 7, wherein:
   the electrical device has an electrical capacitance; and
   the nonzero time corresponds to a charging time sufficient to substantially charge the electrical device to a steady state based on the electrical capacitance and the first electrical resistivity.

12. The method of claim 7, wherein the first power source terminal remains interfaced with the first device terminal when the electrical power source is in the installed position.

13. The method of claim 7, further comprising:
   disconnecting the electrical power source from the first device terminal while the electrical power source is in the installed position.

14. The method of claim 7, wherein:
   moving the electrical power source from the range of pre-charging positions to the installed position comprises allowing the electrical power source to be moved by an external force while resisting motion of the electrical power source by the mechanism, the mechanism having a spring and a damper, the spring having a spring force and the damper having a damping force, the spring force and the damping force being adjusted to cause the electrical power source to be maintained within the range of pre-charging positions for a predetermined, nonzero period of time.

15. The method of claim 7, wherein:
the electrical device has an equivalent electrical capacitance; and
an equivalent RC circuit defined by the resistivity of the first charge path and the equivalent electrical capacitance of the electrical device has a time constant on the order of 0.5-5 seconds.

16. The method of claim 7, wherein:
the second charge path comprises a switch that is open when the electrical power source is within the range of pre-charging positions; and further comprising:
causing the switch to close when the electrical power source is moved from the range of pre-charging positions to the installed position.

17. A device, comprising:
an electrical circuit having a capacitance;
a compartment of the device configured to receive a battery, the compartment having a first device terminal and a second device terminal for electrically connecting the battery with the electrical circuit; and
a mechanism configured to move the battery into the compartment, wherein:
   at a range of pre-charging positions, the battery is electrically connected with the circuit by a first charge path having a first nonzero resistance;
   at an installed position, the battery is electrically connected with the circuit by a second charge path having a second resistance that is less than the first resistance; and
   the mechanism is operable to move the battery from the range of pre-charging positions to the installed position, and to retain the battery within the range of pre-charging positions for a predetermined period of time before moving the battery to the installed position.

18. The device of claim 17, wherein the mechanism comprises a spring and damper, the spring being configured to exert a force to move the battery through the range of pre-charging positions and into the installed position, the damper being configured to resist motion of the battery through the range of pre-charging positions, wherein a spring force of the spring and a damping force of the damper are adapted to cause the mechanism to move the battery through the range of pre-charging positions for the predetermined period of time.

19. The device of claim 17, further comprising a third device terminal proximate to the first device terminal and electrically separated from the first device terminal, the third device terminal being electrically connected with the second charge path; and wherein at the installed position, the battery is electrically connected with the circuit by way of the second charge path by the third device terminal.

20. The device of claim 17, further comprising:
a switch associated with the second charge path, the switch being open when the battery is within the range of pre-charging positions; and
a mechanical linkage connected with the switch and positioned to interfere with the battery or the mechanism when the battery is moved to the installed position, such that the switch is closed by the mechanical linkage when the battery is moved to the installed position.

* * * * *